US005202549A

United States Patent [19]

Decker et al.

[11] Patent Number: 5,202,549

[45] Date of Patent: Apr. 13, 1993

[54] TRANSACTION MACHINE HAVING LIGHTED USER PROMPTS

[75] Inventors: Dale D. Decker, Harrisburg; Otis J. Holder, II, Gastonia, both of N.C.

[73] Assignee: International Business Machines Corporation, Armonk, N.Y.

[21] Appl. No.: 767,451

[22] Filed: Sep. 30, 1991

[51] Int. Cl.[5] .............................................. G06F 15/30

[52] U.S. Cl. .................................... 235/379; 235/375

[58] Field of Search .................. 235/379, 375; 362/26, 362/27, 29, 31, 32

[56] References Cited

U.S. PATENT DOCUMENTS 3,786,500 1/1974 Fiorletta et al. .................... 340/380
3,916,386 10/1975 Teixeira et al. .................. 340/172.5
3,962,702 6/1976 Kriege .................................. 340/380
4,107,784 8/1978 Van Bemmelen .................. 364/900
4,321,672 3/1982 Braun et al. ......................... 364/408
4,555,694 11/1985 Yanagishima et al. ............... 362/26
4,752,876 6/1988 Couch et al. ........................ 364/407
4,761,542 8/1988 Kubo et al. ......................... 235/379
4,884,199 11/1989 Boothroyd et al. ................ 364/408
4,922,419 5/1990 Ohashi et al. ........................ 235/379
5,097,396 3/1992 Myers .................................... 362/29

*Primary Examiner*—William L. Sikes
*Assistant Examiner*—Scott A. Oullette
*Attorney, Agent, or Firm*—A. P. Tennent

[57] ABSTRACT

Apparatus for guiding a user while operating a remote transaction machine, such as an ATM. Various input and output devices located at different positions on the machine are used for entering and receiving data, cards, slips, receipts, currency, and similar items. Each device has an illumination means which is synchronized to the operation of the machine such that the device is illuminated when the next user activity involves the device at that particular location. Illumination is provided by an illuminated border around the device, or by other means, such as an indicator lamp at the device location. With certain output apertures, the object being outputted is illuminated.

14 Claims, 5 Drawing Sheets

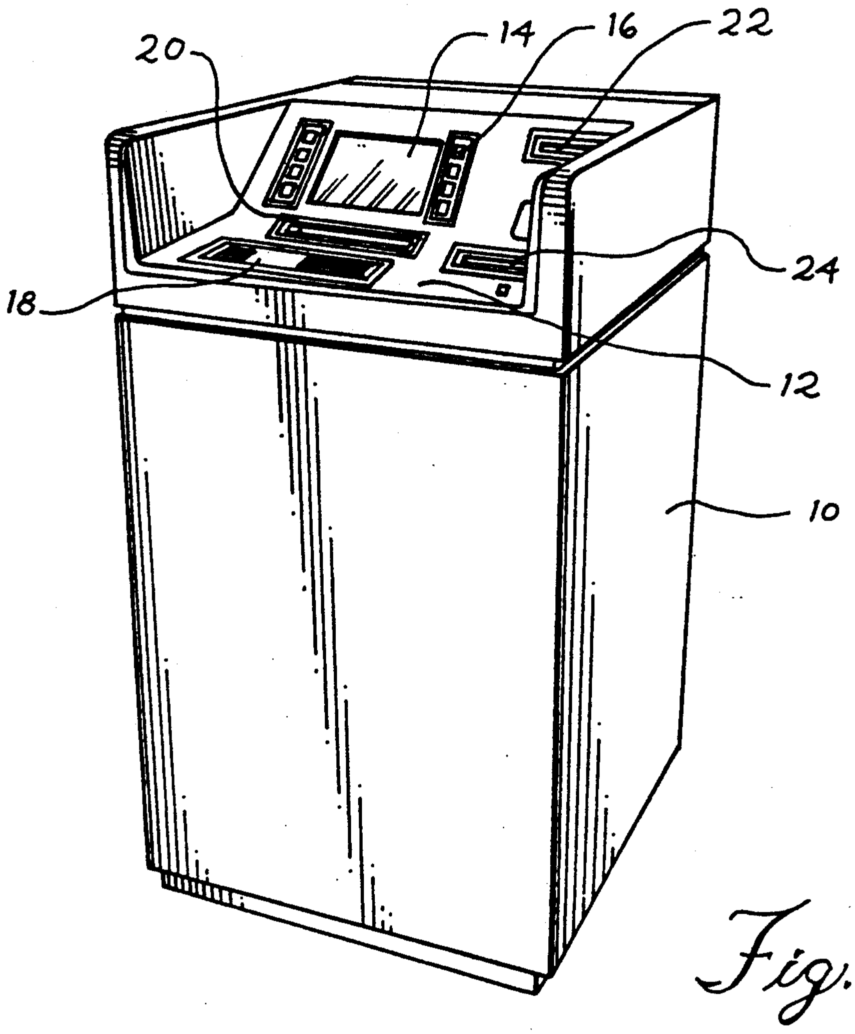
Fig. 1.
Fig. 2.
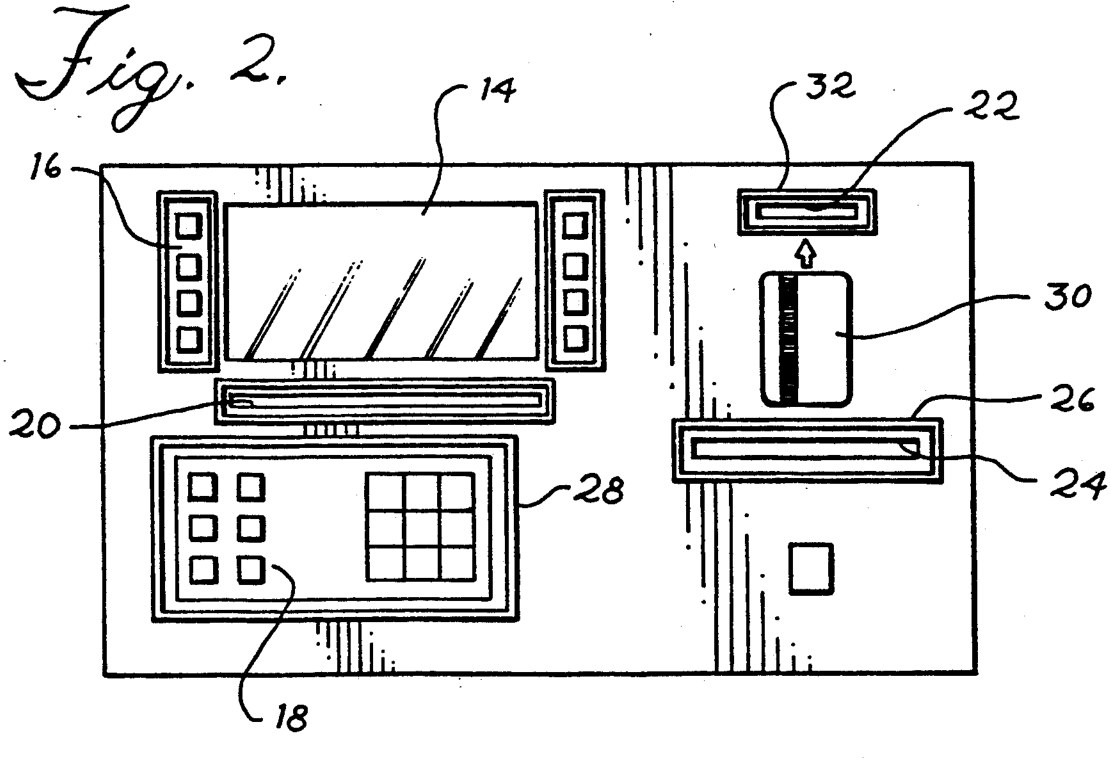

TO APERATURE #2
TO APERATURE #1
60
64
48
62
50
46
44
CONTROLLER
58
59
48
56
1
2
3
54
52

TRANSACTION MACHINE HAVING LIGHTED USER PROMPTS

BACKGROUND OF THE INVENTION

1. Field of the Invention

This invention relates, in general, to remote transaction machines and, more specifically, to apparatus for highlighting. prompting, or directing the user during the use of the transaction machine.

2. Description of the Prior Art

Remote transaction terminals, or machines, are used in a wide variety of applications. Automatic teller machines (ATM's). photographic film deposit machines, mass transit fare card machines, and hotel registration machines are just some of the types of machines available. U.S. Pat. No. 4,752,876, issued on Jun. 21, 1988 to the same assignee as the present invention. discloses a machine of the type suitable for hotel registration. Some remote transaction machines are self contained in that they are not connected to a remote site or computer. Such machines react with the user to accomplish a result without immediate information or feedback from another location. Many machines, however, such as ATM machines, are connected through a communications network to a central facility which, to some extent, controls the activities of the machine.

A common feature of both types of remote transaction machines is the necessity for the user to input and output, or receive, information or objects to and from the machine. Sometimes, during the operation of the machine, it is difficult for the user to know where on the machine to take some action. be it an input or output action. This can be especially difficult in poorly lighted surroundings and when apertures or openings in the machine are to be used to insert or receive objects, such as plastic cards, currency, and transaction receipts.

Attempts to make the machines more user friendly have been made by using various forms of instructions for the user. One conventional type of user guidance uses a status display or panel to indicate to the user the next step to be performed. U.S. Pat. No. 4,321,672, issued on Mar. 23, 1982, shows, in FIG. 4, a status command panel which prompts the user through the necessary steps of using the machine. Although this feature of the ATM can aid the user in determining the next step, the guidance feature disclosed in this patent does not indicate where to take the necessary action. Some machines, such as the control terminal disclosed in U.S. Pat. No. 4,107,784, issued on Aug. 15, 1978, not only guide the user through the necessary steps, but offer a convenient means for changing the description of the steps. In FIG. 16 of that patent, the cover sheet 190 has transparent windows 192 with prompting messages which can be lighted from the area below the cover sheet. Using the cover sheet as a mask over the lighted areas provides an easy method to change the prompt commands, or messages.

A disadvantage of the prompting methods thus far discussed is the fact that the user must locate and read the labels on the various input and output devices of the machine to determine where to take the requested action. In other words, the previously described prompting methods tell what is to be done, but not where to do it. This drawback is solved, at least partially, by the use of the sophisticated prompt unit disclosed in U.S. Pat. No. 4,884,199, which issued on Nov. 28, 1989 to the same assignee as the present invention. In this patent, a display tube is used to produce the prompt messages by indicating the action needed and the location to take the action. The latter is depicted by indicating the location of a particular portion of the machine in a sketch or outline of the machine displayed on the tube. See FIG. 12D of this patent.

While the above described display method offers advantages over the prior art, it still does not directly indicate to the user the location on the machine where the action is to be taken. Even after seeing the display, the user must look at the machine and find the opening or buttons needed to take the appropriate action. As previously stated, this can be difficult in low light conditions. Therefore, it is desirable, and it is an object of this invention, to provide a transaction machine wherein the prompting device directly indicates to the user the location where the next action is to be taken, such indication being highly recognizable even in low-light conditions.

SUMMARY OF THE INVENTION

There is disclosed herein new and useful apparatus for prompting a user during the operation of a remote transaction machine, such as an ATM. The various data entry, data readout, object apertures, and like input-/output devices on the machine are highlighted or illuminated in synchronism with the operation of the machine. The devices are illuminated when the user is expected to take some action regarding the device at that particular location. For example, when currency is to be taken from a slot or aperture in the machine, that particular slot is illuminated.

Illumination may be by various means, such as an illuminated border around the device, a lamp which lights the area of the device, or an indicator light at the device location. According to a specific embodiment of the invention, bundles of optical fibers extend to each device location which is to be illuminated. Light entering the bundles is controlled by a rotating disk which has openings aligned to selectively pass light from a light source to the bundle ends in order to cause only the optical fibers at one or more particular locations to be illuminated. In addition to, or instead of, illuminating the device, an object in the device, or aperture, may be illuminated to prompt the user to remove the object at that location.

BRIEF DESCRIPTION OF THE DRAWINGS

Further advantages and uses of this invention will become more apparent when considered in view of the following detailed description and drawings, in which:

FIG. 1 is a perspective view of a transaction machine utilizing the invention;

FIG. 2 is a functional plan view of the control panel on the machine shown in FIG. 1;

DESCRIPTION OF THE PREFERRED EMBODIMENTS

Figure 3:
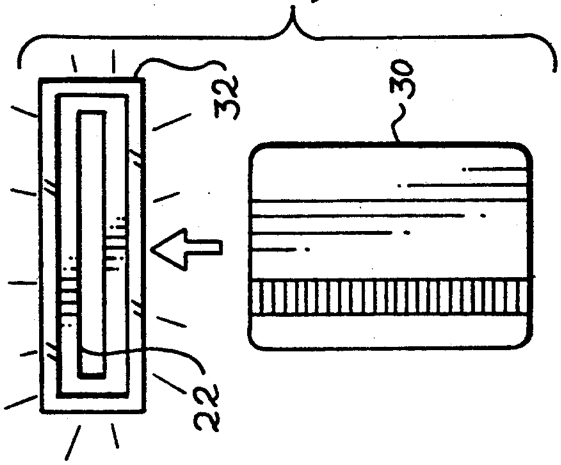
FIG. 3 is a view illustrating one embodiment for illuminating an aperture on the control panel.

Throughout the following description, similar reference characters refer to similar elements or members in all of the figures of the drawings.

Referring now to the drawings, and to FIG. 1 in particular, there is shown a transaction machine representative of the type which may utilize the invention. The illustrated transaction machine is an automatic teller machine (ATM), although the invention is equally applicable to other types of remote transaction machines. The illustrated machine includes the base assembly 10 which contains the inner workings of the machine and supports the control panel 12. In this specific embodiment, the control panel includes the display 14, the function keys 16 located adjacent to the display 14, and the function keys 18 located below the display 14. The function keys 16 and 18 provide a means for entering the input information or data into the machine by the user. The display 14 is used to convey information to the user such as account information and requested user actions. Also included on the control panel 12 are various apertures for openings which can be used to input or output objects during the transaction. These include the currency or bill dispenser aperture 20, the card aperture 22, and the receipt slot or aperture 24. Operation and use of these functions on the control panel can be similar to present ATM systems.

FIG. 2 is a view illustrating the general location and configuration of the input and output devices on the control panel. FIG. 2 also illustrates one embodiment of the invention wherein the input and output devices are surrounded by an illuminating means which can be activated by the control apparatus of the machine to prompt the user through the operation and use of the machine. Each of the apertures in the control panel, that is apertures 20, 22 and 24, is encircled or surrounded by an illuminating border, such as border 26 around aperture 24. Border 26 can be illuminated to prompt the user that the machine is requesting some activity at the aperture 24. Typically, this would be done when a receipt is expected to be taken from the aperture 24 by the user. Thus, the user is directed to the exact location where the activity is to be accomplished without the need to read labels or identifying indicia for each of the apertures on the control panel. In addition, this highlighting or prompting is useful in low light conditions where it would be difficult to read unlighted labels and where the highlighting provided by the borders is more apparent.

Function keys 16 and 18 provide a means for the user to input data to the machine. When a particular bank of function keys is to be used by the user, that bank of function keys can be highlighted by a similar border. For example, the border 28 around the function keys 18 would be illuminated to indicate to the user that the machine is requesting an input from one or several of the input keys or function keys contained within the border 28. The control panel includes the illustration 30 which is permanently adhered to the surface of the panel to indicate that the users plastic card is inserted into the aperture 22 to initiate a transaction. Border 32 would be illuminated when this user action is expected.

FIG. 3 represents, in more detail, the use of the border 32 around the aperture 22 for prompting the user. The border 32 is illustrated in the illuminated mode which would be used to draw the users attention to the aperture 22. Using a series of illuminating bulbs behind an opening in the control panel would provide the desired illumination of the border 32. Other arrangements may be used, including the fiber optic arrangement which is shown and described elsewhere herein.

Figure 4:
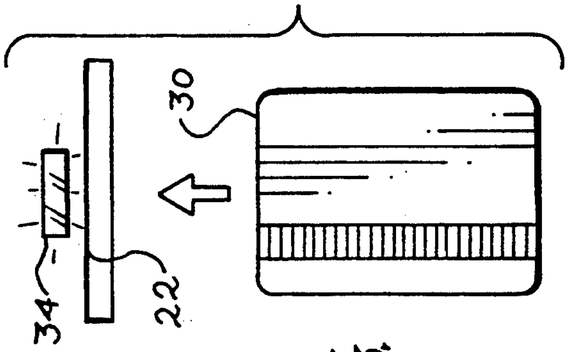
FIG. 4 is a view illustrating another embodiment for illuminating an aperture on the control panel.

FIG. 4 illustrates another embodiment of the invention wherein an indicator light 34 is used to prompt the user that activity is expected at the aperture 22. Although the light 34 does not surround or enclose the aperture 22, the user is still directly prompted that the activity desired is located at aperture 22.

Figure 5:
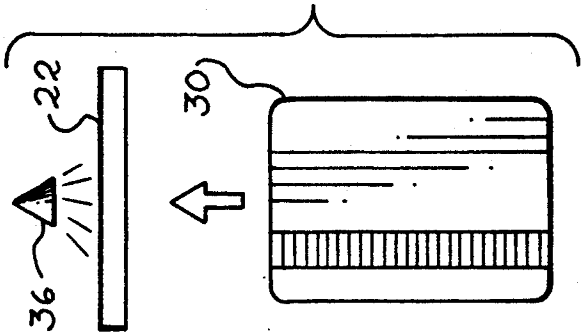
FIG. 5 is a view illustrating still another embodiment for illuminating an aperture on the control panel.

FIG. 5 illustrates still another embodiment of the invention where a lamp or light 36 is illuminated by the control apparatus of the machine in sequence with the operation of the machine to indicate an activity request at aperture 22. Here, the lamp 36 illuminates the area of the control panel around the aperture 22 and also illuminates any object protruding from the aperture 22. In cases where the aperture being illuminated is an output aperture, the output object, such as currency or a receipt slip, would be illuminated by the corresponding indicator lamp.

Figure 6:
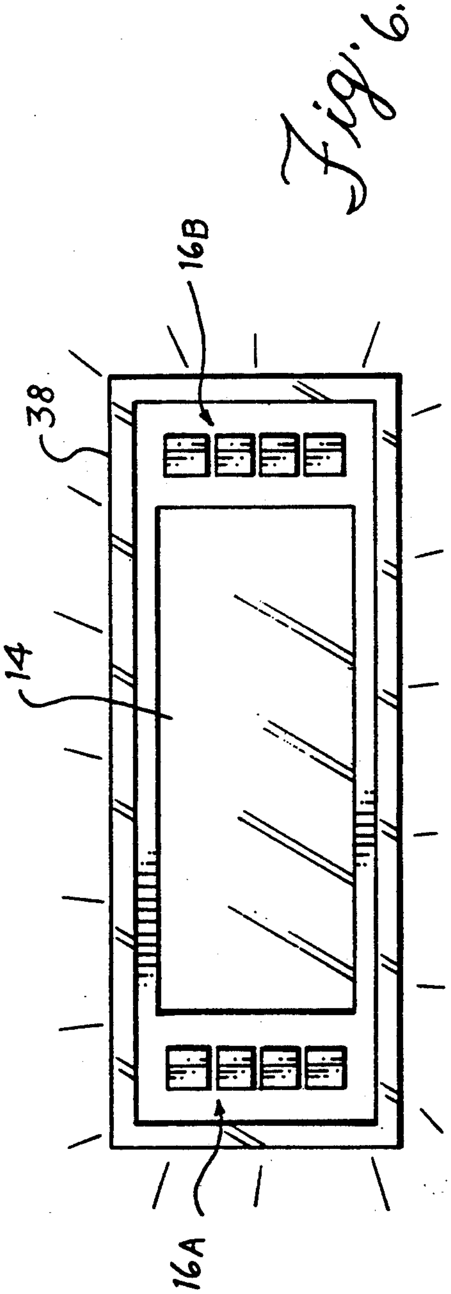
FIGS. 6, 7, 8 and 9 are views illustrating different embodiments for illuminating an information input area or device on the control panel.

FIG. 6 illustrates an arrangement where a border 38, capable of illumination, surrounds several groups of input devices. In this embodiment, the border 38 surrounds the display 14 and the input function keys 16A and 16B. When illuminated, as illustrated, the border 38 indicates that some activity with the display and/or function keys is being requested. This could be simply reading a message on the display 14, or inputting one of the function keys 16A and 16B.

Figure 7:
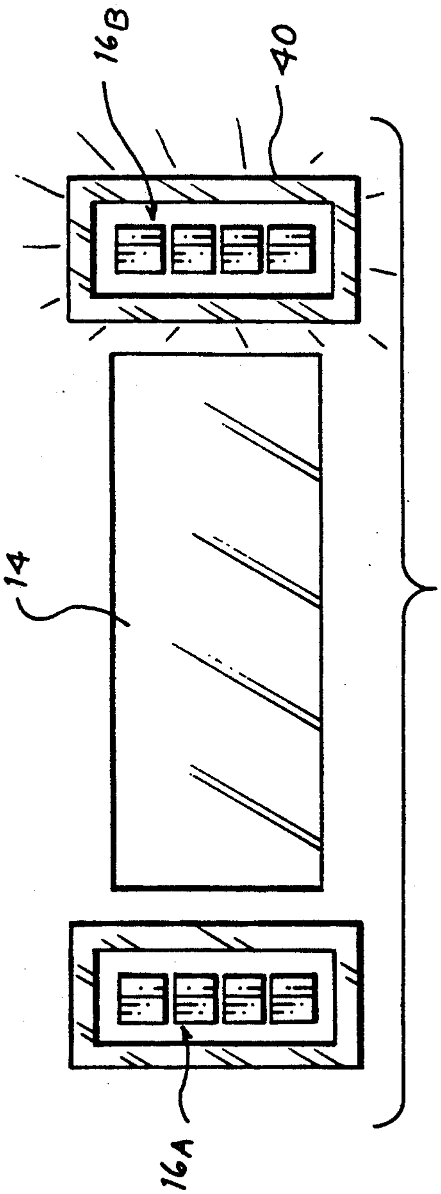

FIG. 7 shows another embodiment wherein the separate groups of function keys are surrounded by separate illuminating borders to further indicate at which group of function keys the user activity is expected. In this illustration, function keys 16B are being highlighted by the border 40 to indicate that the user input is expected at this group of keys as opposed to the function keys 16A.

Figure 9:
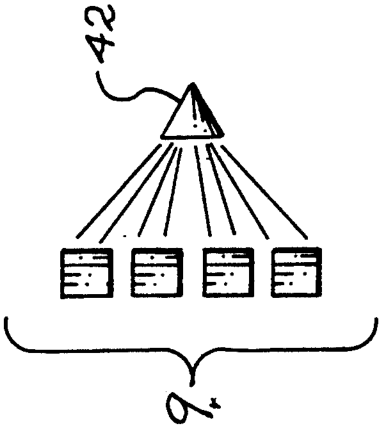
Figure 8:
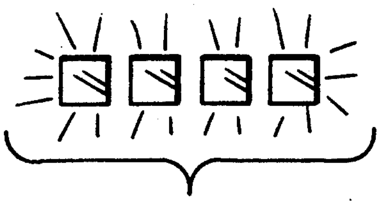

FIG. 8 illustrates another embodiment of the invention wherein the function keys themselves can be illuminated to indicate to the user their expected use for the next input of data. A similar highlighting can be produced by the lamp 42 shown in FIG. 9, which illuminates all of the input keys in the group.

Figures 10, 10A:
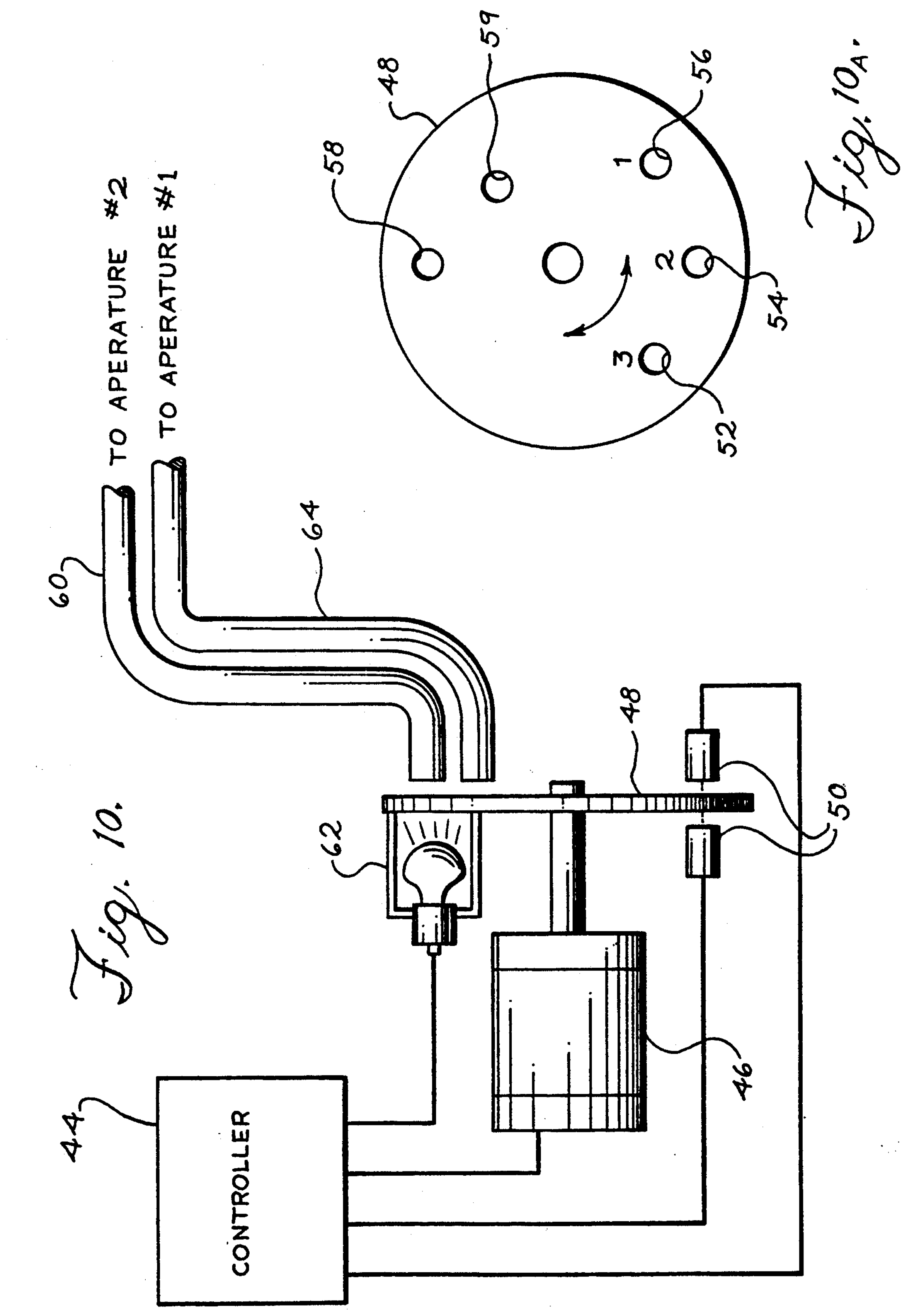
FIG. 10 is a diagram illustrating one embodiment for producing selective illumination at two apertures.
FIG. 10A is a side view of the disk shown in FIG. 10.

FIG. 10 illustrates a specific embodiment of the invention for synchronizing the highlighting or illuminating of two of the apertures in the machine. It is within the contemplation of this invention that more than two apertures may be illuminated and various input devices may be illuminated by the apparatus shown in FIG. 10 as being selectively illuminated. For clarity and for simplicity in describing this specific embodiment of the invention, only two apertures are shown in FIG. 10.

According to FIG. 10, the controller 44 synchronizes the operation of the machine with the light distributing apparatus shown in FIG. 10. The controller 44 controls the DC stepper motor 46 which rotates the rotatable shutter or disk 48, which is also shown in FIG. 10A. The optical sensor device 50 determines the position of the shutter 48 due to the passage of light through the three openings 52, 54 and 56 in shutter 48. When opening 54 is aligned with the optical sensor device 50, light passes through opening 58 and into the fiber optic light bundle 60. This light is conveyed to aperture #2 which is illuminated by the light energy produced by the light source 62. When the controller rotates the disk 48 so that the opening 56 is aligned with the sensor device 50, none of the light from light source 62 is transmitted through a fiber optic bundle, so neither of the two apertures is illuminated. Alignment with opening 52 allows light to pass through opening 59 and illuminate aperture #1. It is emphasized that other arrangements for selectively illuminating the apertures and input devices of the machine may be used without departing from the teachings of the invention.

Figure 12:
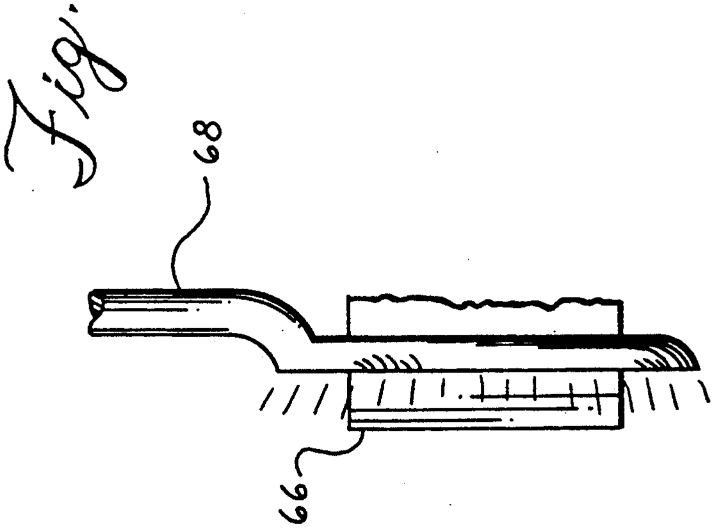
FIG. 12 is a side view of the arrangement shown in FIG. 11.
Figure 11:
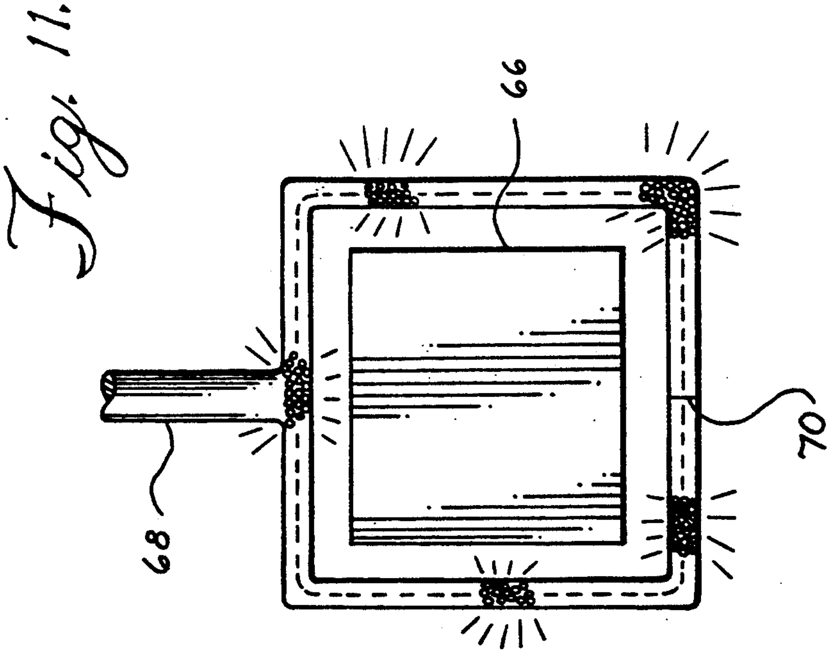
FIG. 11 illustrates an arrangement of fiber optic members to highlight an input button.

FIG. 11 illustrates how the ends of the optical fibers in the bundle may be arranged at the control panel to provide the illuminating border around the input or output device, which is shown in FIG. 11 as a single button 66 for simplicity. FIG. 12 shows a side view of the arrangement shown in FIG. 11. The optical fibers in the bundle 68 are spread out in a rectangular fashion around the button 66 such that their ends radiate light in a direction basically perpendicular to the surface of the control panel. This effectively causes the light conveyed or transmitted by the optical fibers to produce a border around the associated input or output device. In order to achieve this arrangement and distribution of light, the optical fibers are of different lengths so that some of the fibers would terminate close to the entire bundle package and some of the optical fibers would terminate near the lower end 70 of the illuminating border.

Figure 13:
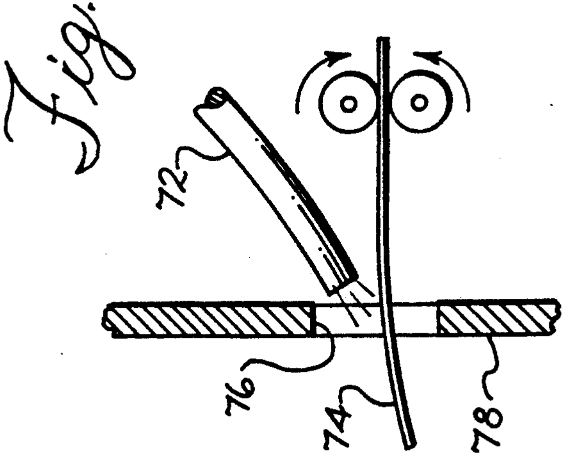
FIG. 13 is a side view of an optical fiber bundle being used to illustrate an output object at a control panel aperture.

FIG. 13 illustrates an embodiment wherein an optical fiber bundle 72 is used to illuminate an object, such as a deposit slip 74, protruding from the aperture 76 in the control panel 78. According to this arrangement, the fiber optic bundle illuminates the object in the opening rather than highlights or surrounds the opening with a border of illuminating light.

It is emphasized that numerous changes may be made in the above-described apparatus without departing from the teachings of the invention. For example, illuminating devices not employing optical fibers could be used, or only a portion of the input/output devices or locations need be highlighted. In addition, the illumination need not be synchronized according to every expected use of the device, but according to certain selected devices or levels of utilization during the operation of the machine. It is intended that all of the matter contained in the foregoing description, or shown in the accompanying drawings, shall be interpreted as illustrative rather than limiting.

We claim:

1. A transaction machine suitable for allowing a user to conduct a transaction by using various input and output devices on the machine, said transaction machine comprising:

a plurality of input devices for the user to enter information or objects into the machine;

a plurality of output devices for the user to receive information or objects from the machine;

illuminating means, which provides illumination at specific physical locations of at least some of said input and output devices, for indicating those locations for a user action; and control means for synchronizing the illuminating means such that the user is prompted about the location of an awaiting user action by illuminating the input or output device at that location.

2. The transaction machine of claim 1 wherein the illuminating means includes an illuminated border around an input or output device.

3. The transaction machine of claim 1 wherein the illuminating means includes means for illuminating a data entry device from internally within the transaction machine.

4. The transaction machine of claim 1 wherein the illuminating means includes means for directing light upon a data entry device from the outside of the transaction machine.

5. The transaction machine of claim 1 wherein the illuminating means includes means for illuminating an area near to the input or output device to indicate the location of that device.

6. The transaction machine of claim 1 wherein a group of input devices is illuminated to prompt the user.

7. The transaction machine of claim 1 wherein only a single input or output device is illuminated, at a given time, to prompt the user.

8. The transaction machine of claim 1 wherein the illumination means includes a light source, a plurality of bundles of optical fibers extending to the input and output devices, and a shutter positioned between the light source and the optical fiber bundles which is movable to allow light to selectively irradiate the optical fiber bundles.

9. The transaction machine of claim 8 wherein the movable shutter comprises a rotatable disc having apertures therein which are spaced apart at predetermined locations.

10. The transaction machine of claim 1 wherein the transaction machine is an automated teller machine having apertures therein for inputting and outputting objects, and the illumination means illuminates the aperture only when the user is expected to take some action which involves that same aperture.

11. The transaction machine of claim 1 wherein at least one output device is an aperture through which an object can be retrieved by the user, and wherein the illuminating means illuminates at least a portion of an output object existing at said aperture for the purpose of prompting, even in low-light conditions, the user to remove the object.

12. An automated transaction machine which allows a user to conduct a financial transaction by using various input and output devices on the machine, said transaction machine comprising:

a first aperture for inserting an identification card into the machine;

a second aperture for receiving currency from the machine;

first means for illuminating the first aperture;

second means for illuminating the second aperture separately from the first aperture; and control means for synchronizing the operation of the first and second illuminating means so that the corresponding aperture is illuminated to prompt the user that an object is to be inserted into or removed from that aperture.

13. A transaction machine suitable for allowing a user to conduct a transaction by using various input and output devices on the machine, said transaction machine comprising, a plurality of input devices for the user to enter information or objects into the machine:

a plurality of output devices for the user to receive information or objects from the machine:

a light source:

a plurality of bundles of optical fibers extending to the input and output devices:

a rotatable disc having apertures therein which are spaced apart at predetermined locations:

means for rotating the disc to allow light to selectively irradiate the optical fiber bundles: and control means for synchronizing the rotating means such that the user is prompted about the location of an awaiting user action by illuminating that location.

14. A method of sequentially guiding a user while operating a transaction machine having a plurality of devices which permit machine-user interaction, said method including the steps of:

providing separate illumination substantially at a first of the devices only when the user is to interact with that device:

determining when the user interacts with said first device:

determining which device the user is to interact with next and, after such determination, providing separate illumination substantially at the determined next device for interaction, thereby guiding the user to that device.

* * * * *